United States Patent [19]
Jung

[11] Patent Number: 5,640,420
[45] Date of Patent: Jun. 17, 1997

[54] VARIABLE LENGTH CODER USING TWO VLC TABLES

[75] Inventor: Hae-Mook Jung, Seoul, Rep. of Korea

[73] Assignee: Daewoo Electronics Co., Ltd., Seoul, Rep. of Korea

[21] Appl. No.: 622,232

[22] Filed: Mar. 27, 1996

[30] Foreign Application Priority Data

Mar. 28, 1995 [KR] Rep. of Korea .................... 95-6629

[51] Int. Cl.⁶ .................................................. H04B 1/66
[52] U.S. Cl. .................... 375/240; 348/405; 348/419; 358/261.1; 358/430; 375/246
[58] Field of Search ............................ 348/405, 419; 358/333, 335, 338, 261.1, 433, 430; 375/246

[56] References Cited

U.S. PATENT DOCUMENTS

| 4,706,260 | 11/1987 | Fedele | 375/27 |
| 4,894,713 | 1/1990 | Delogne | 358/133 |
| 4,920,426 | 4/1990 | Hatori | 358/433 |
| 4,957,688 | 9/1990 | De With | 358/133 |
| 5,349,383 | 9/1994 | Parke | 348/397 |
| 5,400,075 | 3/1995 | Savatier | 348/384 |
| 5,402,244 | 3/1995 | Kim | 358/261.2 |
| 5,412,484 | 5/1995 | Yoshikawa | 358/433 |
| 5,489,944 | 2/1996 | Jo | 348/405 |

Primary Examiner—Stephen Chin
Assistant Examiner—Mohammad H. Ghayour
Attorney, Agent, or Firm—Anderson Kill & Olick P.C.

[57] ABSTRACT

A digital video signal encoder for coding a block of a digital video signal first converts the block of the digital video signal into a set of quantized transform coefficients having a low and a high frequency zones and scans the set of quantized transform coefficients to produce a first and a second subsets of scanned coefficients. The scanned coefficients of the first and the second subsets are converted into a first and a second sets of one or more RLC codes, respectively. The digital video signal encoder performs the coding each RLC code of the first and the second sets to generate a first and a second sets of one or more variable length codewords.

5 Claims, 3 Drawing Sheets

VARIABLE LENGTH CODER USING TWO VLC TABLES

FIELD OF THE INVENTION

The present invention relates to a variable length coder for use in an image signal encoding apparatus; and, more particularly, to a variable length coder employing two different variable length coding(VLC) tables.

DESCRIPTION OF THE PRIOR ART

Transmission of digitized video signals can deliver video images of a much higher quality than the transmission of analog signals. When an image signal comprising a sequence of image "frames" is expressed in a digital form, a substantial amount of data is generated for transmission, especially in the case of high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

In the conventional hybrid coding technique, a block of a digital video signal is compressed by employing two-dimensional transform technique, and quantization of transform coefficients.

The block of the digital video signal may be either one of an interblock and an intrablock, wherein the interblock represents a block of motion compensated DPCM (differential pulse code modulation) signal as well known in the art and the intrablock denotes a block of pixel data for a current frame of the digital video signal.

The two-dimensional transform technique, e.g., DCT, which reduces or removes spatial redundancies between image data within the intrablock or the interblock, converts a block of digital image data, for example, a block of 8×8 pixels, into a set of transform coefficient data. By processing such transform coefficient data with a quantizer, zig-zag scanning, a run-length coding(RLC) and a variable length coding(VLC), the amount of data to be transmitted can be effectively compressed.

Specifically, the VLC technique employs a VLC table, wherein one variable length codeword from the VLC table is assigned to one source digital code, e.g., a fixed length run-level codeword resulting from the RLC. In the VLC technique, since a shorter variable length codeword is assigned to a source digital code which statistically occurs more frequently, the average length of the variable length codeword becomes shorter than that of the source digital code, thereby rendering it possible to achieve data compression.

Since, however, such a conventional VLC technique typically employs only one VLC table constituted based on the entire statistics of the source digital codes, without considering a fact that occurrences of a source digital code vary depending on a frequency zone it belongs to, the resultant coding efficiency may be degraded.

SUMMARY OF THE INVENTION

It is, therefore, an object of the invention to provide a variable length coder capable of providing an efficient bit rate reduction by selectively employing two different VLC tables, depending a local statistics of a video signal.

In accordance with the invention, there is provided a digital video signal encoder for coding a block of a digital video signal, which comprises:

means for converting the block of the digital video signal into a set of quantized transform coefficients having a low and a high frequency zones;

scanning means for scanning the set of quantized transform coefficients to produce a first and a second subsets of scanned coefficients, the scanned coefficients of the first subset corresponding to the low frequency zone and the scanned coefficients of the second subset corresponding to the high frequency zone;

first runlength coding(RLC) means for converting the scanned coefficients of the first subset into a first set of one or more RLC codes;

first variable length coding(VLC) means for coding each RLC code of the first set to thereby generate a first set of one or more variable length codewords; and second RLC means for converting the scanned coefficients of the second subset into a second set of one or more RLC codes; and second VLC means for coding each RLC code of the second set to thereby generate a second set of one or more variable length codewords.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
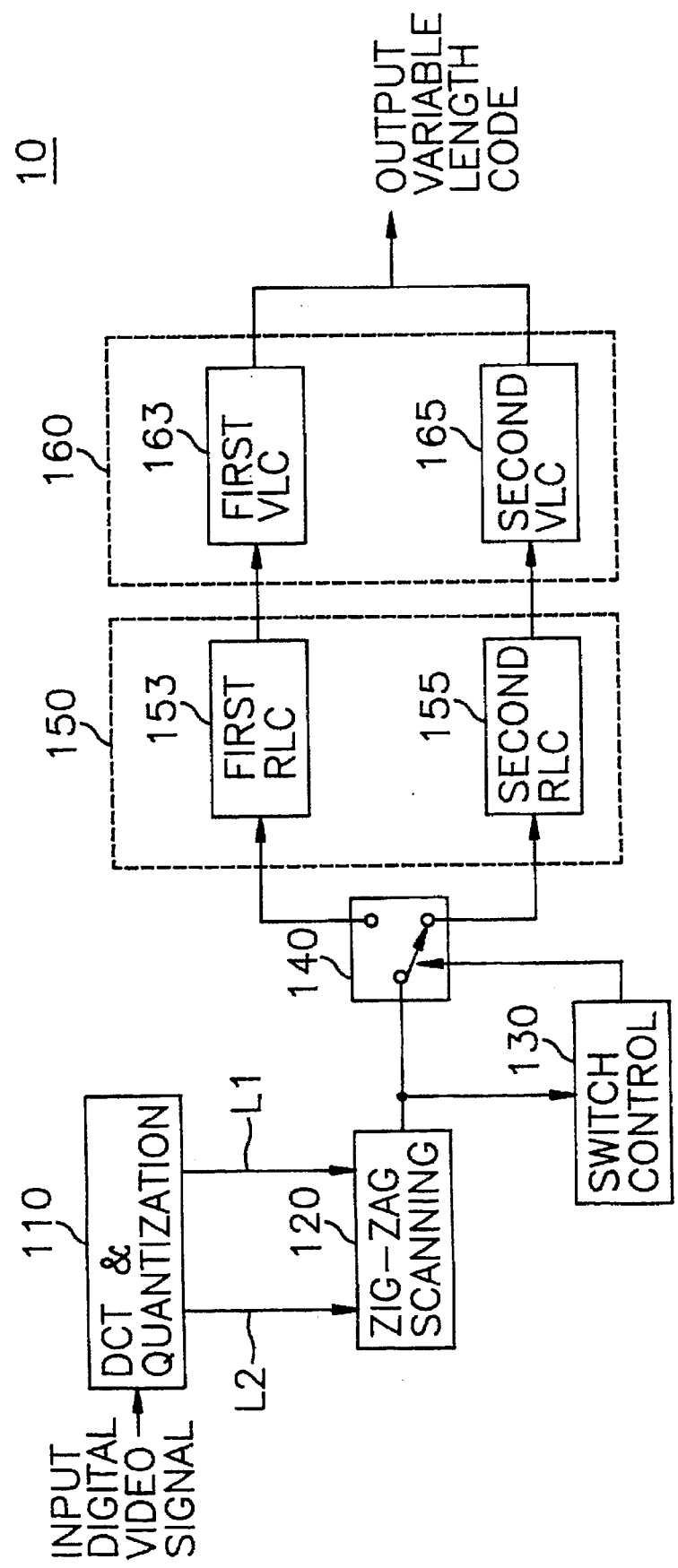
FIG. 1 offers a block diagram of an image signal encoding system employing a variable length coder of the present invention.

Referring to FIG. 1, there is shown a block diagram of an improved image signal encoding apparatus 10 having a variable length coder employing two variable length coding (VLC) blocks having different VLC tables in accordance with the present invention.

The encoding apparatus 10 comprises a DCT(discrete cosine transform) and quantization block 110, a zig-zag scanning block 120, a switch control block 130, a switch 140, a runlength coding(RLC) circuit 150 and a variable length coder 160 having two VLC blocks 163 and 165.

An input digital video signal is provided from a signal source (not shown), for example, a video camera. The input digital video signal is applied to the DCT and quantization block 110 on a block-by-block basis. The block size typically ranges between 8×8 and 32×32 pixels. A block of the input digital video signal may be either an intrablock or an interblock as described above.

At the DCT and quantization block 110, each block of the input digital video signal is converted into a block of, e.g., DCT coefficients by using such a conventional transform technique as DCT, wherein, as well known in the art, non-zero or significant DCT coefficients mainly appear in a low frequency zone which includes a DC coefficient and zero or insignificant DCT coefficients are concentrated in a high frequency zone.

Figure 2A:
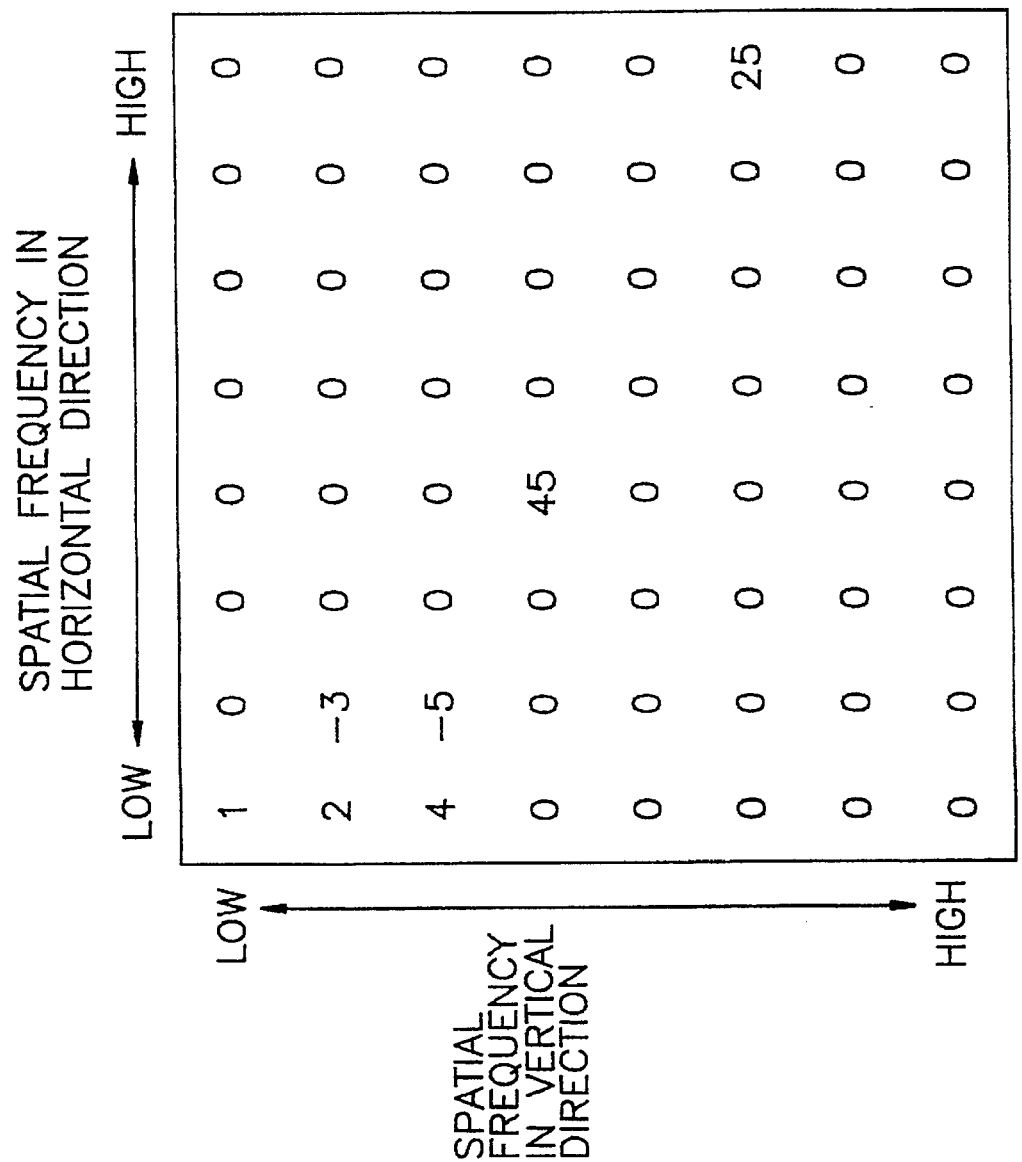
FIG. 2A shows an exemplary block of quantized DCT coefficients.

The DCT coefficients in the block are then quantized into a block of quantized DCT coefficients through the use of any known quantization method at the DCT and quantization block 110. As well known in the art, insignificant DCT coefficients concentrated in the high frequency zone are converted into zero-valued quantized DCT coefficients by the quantization. Referring to FIG. 2A, there is illustrated an exemplary block of quantized DCT coefficients, wherein non-zero valued quantized DCT coefficients are mainly located within the low frequency zone at the left-top corner of the block, while most of zero-valued coefficients are located in the high frequency zone. The DCT and quantization block 110 outputs the block of quantized DCT coefficients to the zig-zag scanning block 120 via a line L1. An intra/inter mode selection signal is also provided to the zig-zag scanning block 120 via a line L2, the intra/inter mode selection signal representing whether the block of quantized DCT coefficients corresponds to an intrablock or an interblock.

Figure 2B:
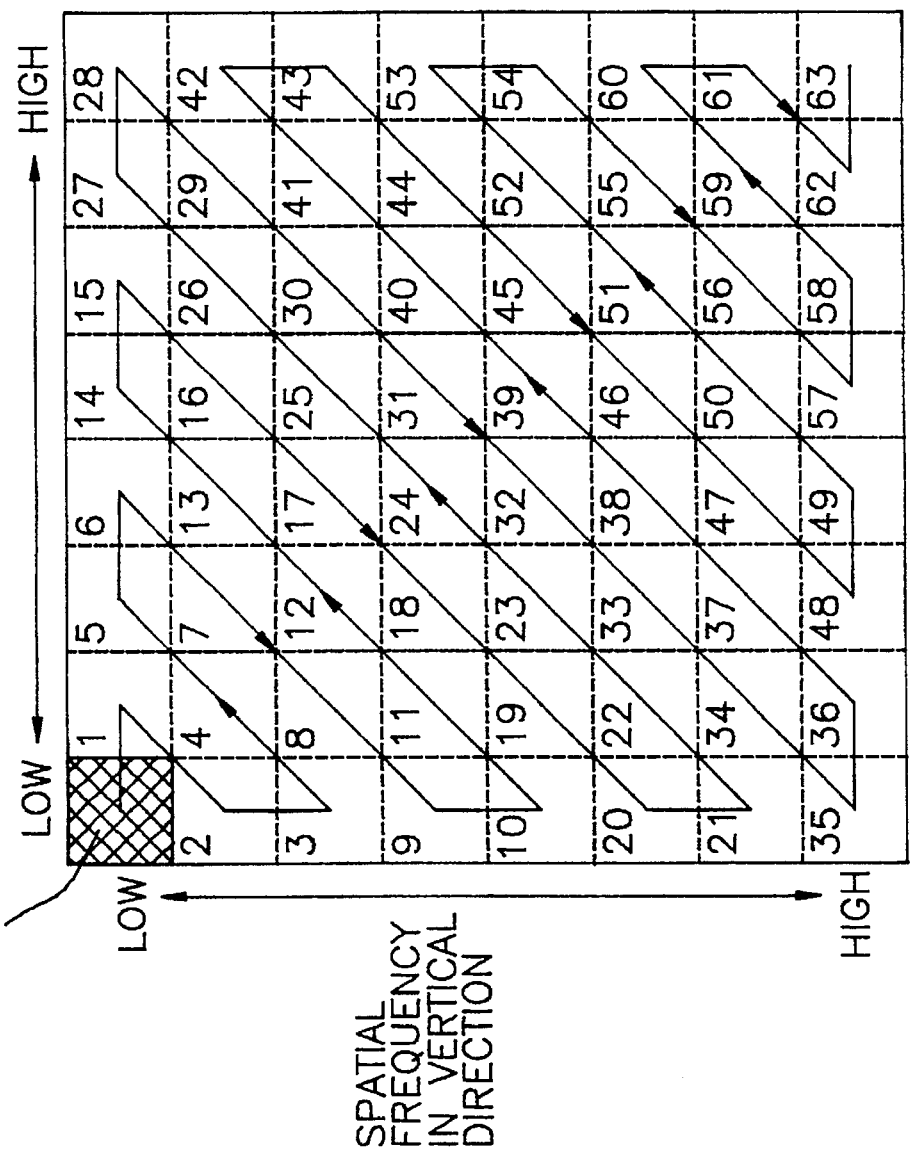
FIG. 2B illustrates a conventional zig-zag scanning sequence.

The zig-zag scanning block 120 scans the block of quantized DCT coefficients along a predetermined, e.g., zig-zag scanning path, progressively from low frequency quantized DCT coefficients towards high frequency quantized DCT coefficients as shown in FIG. 2B, wherein the scanning sequence is represented by numerals at corresponding positions of the quantized DCT coefficients. Specifically, in response to the intra mode selection signal, the zig-zag scanning block 120 preforms the zig-zag scanning starting from a first AC coefficient located at a position represented by the numeral "1" as shown in FIG. 2B. As well known in the art, if the block of the quantized DCT coefficients corresponds to an intrablock, the DC coefficient positioned at the left-top corner of the block is coded separately by using, e.g., DPCM technique.

On the other hand, in response to the inter mode selection signal, the zig-zag scanning block 120 performs the zig-zag scanning from the DC coefficient located at the left-top corner of the block. The scanned quantized DCT coefficients are then coupled to the switch control block 130 and the RLC circuit 150 through the switch 140, wherein the RLC circuit 150 has two RLC blocks 153 and 155.

The switch control block 130 counts the number of the scanned quantized DCT coefficients from the zig-zag scanning block 120 and provides a first control signal S1 to the switch 140 if a counted number is equal to or less than a predetermined number N, e.g., 10, representing an end of the low frequency zone in the block of the quantized DCT coefficients, N being an positive integer larger than 1 but smaller than 64. When the counted number is larger than the predetermined number, the switch control block 130 generates a second control signal S2 to the switch 140.

In response to the first and the second control signals S1 and S2, the switch 140 provides the scanned quantized DCT coefficients to each of the first and the second RLC blocks 153 and 155. In other words, the first N scanned quantized DCT coefficients within the low frequency zone of the block are provided to the first RLC block 153 and the remaining coefficients in the high frequency zone are transferred to the second RLC block 155.

Subsequently, each of the first and the second RLC blocks 153 and 155 sequentially converts the scanned quantized DCT coefficients inputted thereto into run-level pairs, each run-level pair representing a run-length and a corresponding level, wherein the run-length represents the number of zeros in a run of continuous zeros preceding a non-zero value and the level indicates the magnitude of the non-zero value following the run of continuous zeros.

In Tables 1 and 2, there are shown exemplary sets of run-level pairs generated by the first and the second RLC blocks 153 and 155, respectively, from the block of quantized DCT coefficients depicted in FIG. 2A.

TABLE

| RUN-LENGTH | LEVEL |
|---|---|
| 1 | 2 |
| 0 | 4 |
| 0 | −3 |
| 3 | −5 |
| end low frequency zone | |

| RUN-LENGTH | LEVEL |
|---|---|
| 15 | 45 |
| 35 | 25 |
| end high frequency zone | |

The set of run-level pairs from the first and the second RLC blocks 153 and 155 are provided to the first and second VLC blocks 163 and 165, respectively.

In accordance with the present invention, the first VLC block 163 converts run-level pairs of the low frequency zone from the first RLC block 153 into variable length codewords by using a conventional VLC table, wherein a shorter variable length codeword is assigned to a run-level pair having a shorter runlength in case run-level pairs having an identical level. At the second VLC block 165 of the present invention, on the other hands, run-level pairs corresponding to the high frequency zone of the block are converted into variable length codewords by using a different VLC table in such a manner that a shorter variable length codeword is assigned to a run-level pair having a longer runlength if run-level pairs share an identical level. This reflects the statistics of the high frequency zone, wherein a larger runlength occurs more frequently than a shorter runlength.

Thereafter, the variable length codewords from the variable length coder 160 are provided to a transmitter(not shown) for the transmission thereof.

While the present invention has been described with respect to the particular embodiments, it will be apparent to those skilled in the art that various changes and modifications may be made without departing from the scope of the invention as defined in the following claims.

What is claimed is:

1. A digital video signal encoder for coding a digital video signal, wherein the digital video signal is divided into a plurality of processing blocks, which comprises:

means for converting a processing block of the digital video signal into a set of quantized transform coefficients having a low and a high frequency zones;

scanning means for scanning the set of quantized transform coefficients along a predetermined scanning sequence progressing from low frequency quantized transform coefficients towards high frequency quantized transform coefficients to produce a first and a second subsets of scanned coefficients based on a predetermined frequency boundary, the scanned coefficients of the first subset corresponding to the low frequency zone and the scanned coefficients of the second subset corresponding to the high frequency zone;

first runlength coding(RLC) means for converting the scanned coefficients of the first subset into a first set of one or more RLC codes;

first variable length coding(VLC) means for coding each RLC code of the first set to thereby generate a first set of one or more variable length codewords;

second RLC means for converting the scanned coefficients of the second subset into a second set of one or more RLC codes; and second VLC means for coding each RLC code of the second set to thereby generate a second set of one or more variable length codewords.

2. The digital video signal encoder in accordance with claim 1, wherein the scanning means includes:

a zig-zag scanner for scanning the set of quantized transform coefficients along a predetermined scanning sequence progressing from low frequency quantized transform coefficients towards high frequency quantized transform coefficients to sequentially generate scanned coefficients;

control means for counting the number of the scanned coefficients to produce a first control signal if a counted number is equal to or smaller than a predetermined number corresponding to the predetermined frequency boundary and to produce a second control signal if a counted number is larger than the predetermined number; and means, in response to the first control signal, for producing the first subset of scanned coefficients and, in response to the second control signal, for generating the second subset of scanned coefficients.

3. The digital video signal encoder in accordance with claim 2, wherein the set of quantized transform coefficients includes 8×8 quantized transform coefficients and the predetermined number is 10.

4. The digital video signal encoder in accordance with claim 3, wherein said first VLC means is characterized in that a shorter variable length codeword is assigned to a RLC code which statistically occurs more frequently in the low frequency zone.

5. The digital video signal encoder in accordance with claim 4, wherein said second VLC means is characterized in that a shorter variable length codeword is assigned to a RLC code which statistically occurs more frequently in the high frequency zone.

* * * * *